(12) United States Patent
Gabrielsson et al.

(10) Patent No.: US 12,478,903 B2
(45) Date of Patent: Nov. 25, 2025

(54) CONTINUOUS DISC FILTER DEVICE

(71) Applicant: Valmet Technologies Oy, Espoo (FI)

(72) Inventors: Karl Gabrielsson, Saltsjo-Boo (SE); Tony Ingemar Borkenius, Vendelso (SE); Ramesh Naidu Penta, Maharashtra (IN); Sanjay Yallure, Maharashtra (IN); Shailesh Fulse, Pune (IN); Robert B. Schiavi, Queensbury, NY (US)

(73) Assignee: Valmet Technologies Oy, Espoo (FI)

( * ) Notice: Subject to any disclaimer, the term of this patent is extended or adjusted under 35 U.S.C. 154(b) by 510 days.

(21) Appl. No.: 17/955,965

(22) Filed: Sep. 29, 2022

(65) Prior Publication Data

US 2023/0110055 A1    Apr. 13, 2023

Related U.S. Application Data

(60) Provisional application No. 63/254,558, filed on Oct. 12, 2021.

(51) Int. Cl.
*B01D 33/23* (2006.01)
*B01D 33/74* (2006.01)

(52) U.S. Cl.
CPC .............. *B01D 33/23* (2013.01); *B01D 33/74* (2013.01)

(58) Field of Classification Search
CPC ......... B01D 33/21; B01D 33/23; B01D 33/74
See application file for complete search history.

(56) References Cited

U.S. PATENT DOCUMENTS

| | | | |
|---|---|---|---|
| 3,193,105 A | 7/1965 | Putnam | |
| 3,471,026 A | 10/1969 | Riker | |
| 4,220,537 A | 9/1980 | Takahashi et al. | |
| 4,676,901 A | 6/1987 | Ragnegard | |
| 4,678,575 A * | 7/1987 | Frykhult | B01D 33/74 210/345 |

(Continued)

FOREIGN PATENT DOCUMENTS

| | | | |
|---|---|---|---|
| CN | 105214368 A | 1/2016 | |
| WO | WO-2013083401 A1 * | 6/2013 | ............. B01D 33/21 |

OTHER PUBLICATIONS

Translation of WO 2013/083401 (Year: 2013).*

*Primary Examiner* — Benjamin M Kurtz
(74) *Attorney, Agent, or Firm* — James Earl Lowe, Jr.

(57) ABSTRACT

A continuous disc filter device including a slurry containing bath, and a disc filter assembly comprising a rotor assembly supported to turn on a horizontal axis and having a filtrate outlet end, a plurality of filter discs spaced apart along the length of the rotor assembly horizontal axis, a plurality of spaced apart discharge conduits, and a plurality of disc filter section support and filtrate channel arms. Each disc filter section has a disc filter section filtrate outlet therein for filtrate to leave the disc filter section. A plurality of spaced apart discharge conduits each includes a discharge conduit housing extending along the rotor assembly horizontal axis and having a longitudinally extending discharge conduit filtrate passageway therein. Each discharge conduit is connected at one end to the rotor assembly filtrate outlet end and connected to respective disc filter section filtrate outlets, and each discharge conduit filtrate passageway is positioned between adjacent filter sections.

6 Claims, 12 Drawing Sheets

(56) References Cited

U.S. PATENT DOCUMENTS

| | | | |
|---|---|---|---|
| 4,931,179 A | 6/1990 | Nilsson | |
| 4,995,991 A | 2/1991 | Jokkoi et al. | |
| 5,273,651 A * | 12/1993 | Nilsson | B01D 33/74 |
| | | | 210/404 |
| 6,283,306 B1 * | 9/2001 | Nilsson | B01D 33/21 |
| | | | 210/334 |
| 2005/0121381 A1 * | 6/2005 | Sheets | B01D 33/21 |
| | | | 210/345 |

\* cited by examiner

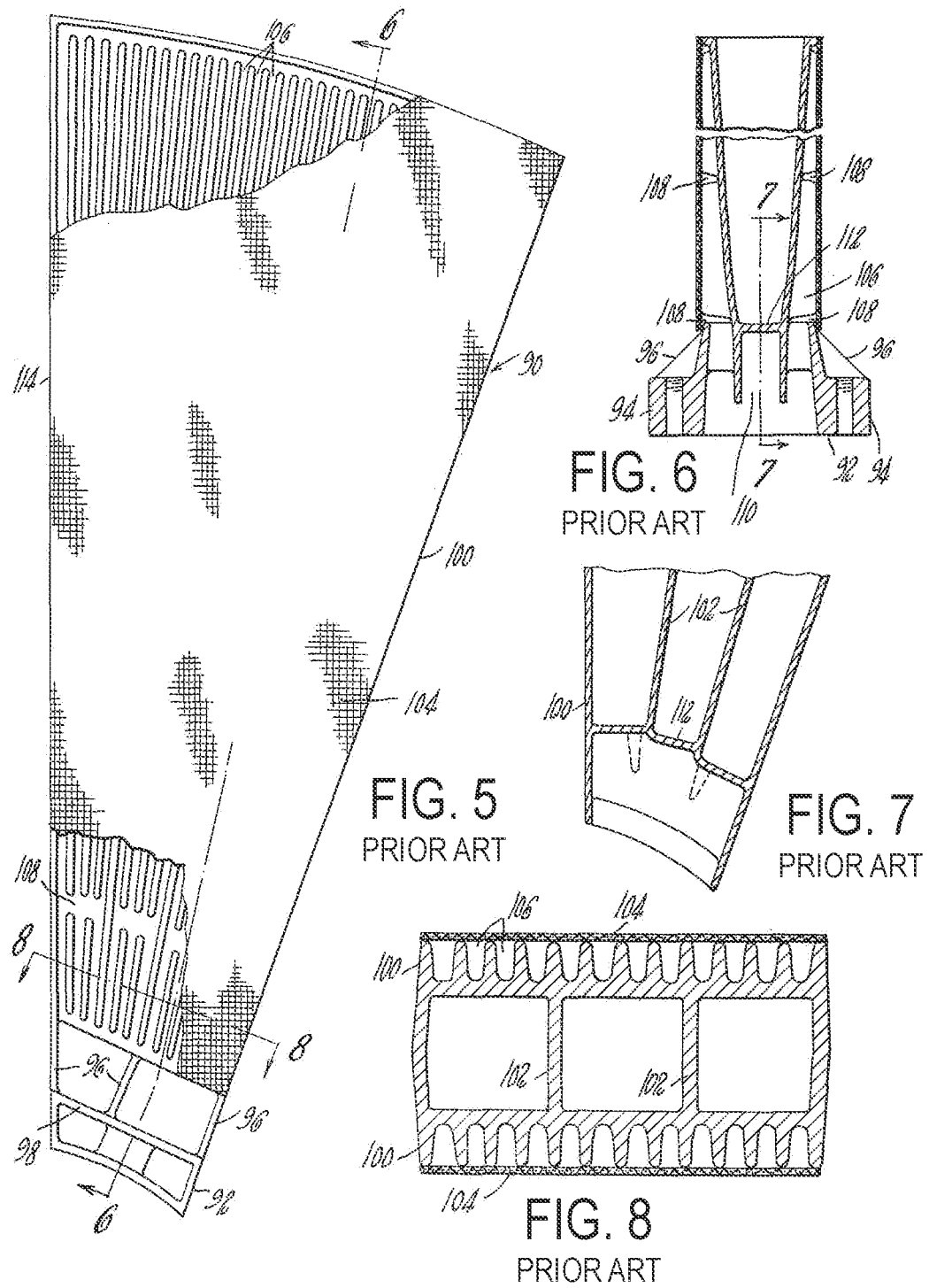

CONTINUOUS DISC FILTER DEVICE

BACKGROUND

The present disclosure relates to improvements in continuous disc filters.

A disc filter of the general type includes a slurry containing bath, a disc filter assembly rotatably supported with relation to the bath and comprising a core assembly adapted to rotate on a horizontal axis, and a plurality of sectioned filter discs spaced along the core assembly.

Each filter section comprises two oppositely facing suction surfaces covered by filtered screens onto which the filter cake is deposited by an air suction applied while the filter section is passing through the slurry bath, the deposited layer being subsequently stripped from the screens when the filter section, during continued rotation of the filter disc assembly, emerges from the bath.

A disc filter of the type described is conventionally provided with a series of discharge conduits which extend along the length of the core assembly each being connected at the station of each sectioned disc filter unit to a designated filter section which occupies the same angular position along the core assembly.

The discharge conduits are connected to a vacuum manifold located at one end of the slurry bath. The manifold includes means operative selectively to apply a suction to, and to open to atmosphere each of the exhaust conduits and filter sections.

A conventional continuous disc filter is described by reference to U.S. Pat. No. 3,193,105 issued Feb. 6, 1961, which is incorporated herein by reference. Inasmuch as the improved continuous disc filter of this disclosure incorporates some of the features found in U.S. Pat. No. 3,193,105, those features are described by reference to FIGS. 1 to 10 from U.S. Pat. No. 3,193,105 reproduced herein.

The disc filter illustrated in FIGS. 1 to 10 comprises a slurry containing bath 20 in which is mounted a rotatable disc filter assembly comprising a core assembly 23 including at the ends thereof short shafts 21, 22 on which the core assembly is mounted to turn. The bearing shafts 21, 22 extend through end walls 24, 26 of the bath 20 and are mounted to rotate in bearings 28, 30 carried on external bearing supports 32, 34. Along the length of the core assembly inside the bath are mounted a series of sectioned filter discs generally indicated at 36 in FIG. 1. The slurry bath 20 is provided further at the left-hand side as shown in FIG. 2 with a series of chutes 38 which are disposed between the adjacent filter discs, and externally of the two end filter discs of the series to receive the filter cake which is peeled off from the sectioned screen surfaces of the filter discs during operation. As generally indicated in FIG. 2 each of the cuter of FIG. 3 extends upwardly above the level of the slurry so that the liquid is exuded therefrom. Each chute at its lower end is provided with an opening which connects with a stock discharge area 40. An extension 42 of each chute extending over the top of the core assembly 23 assists further to collect the filter cake peeled off from the suction filter screens of the several filter sections as they moved to a vertical position by the continued rotation of the filter assembly.

The core assembly 23 is continuously driven in a clockwise direction as shown in FIG. 2 through driving connections which include a drive belt 44 which rides over a driven pulley 46 on a transversely extending worm drive shaft 43. A worm 50 on the shaft 48 engages with a worm gear 52 secured to an outer end of the core assembly 23. The driving connections above described including the worm gear and shaft are mounted with-in a housing 54 carried by the bearing support 34. In the illustrated construction there is provided an additional driving means for moving back and forth one of the jets or showers which is used for cleaning the filter screen. The shower is moved back and forth at a varying rate to apply an equal amount of water to all portions of the rotating filter screen. The shower driving means comprises, at the opposite end of the core assembly from the drive above described a sprocket 56 and sprocket chain 58 which passes around the sprocket 56 and around a sprocket 69 fixed to a short cam shaft 62. The movable jet referred to, as indicated in FIGS. 1 to 4 inclusive, comprises a water supply pipe 64 which extends overhead along the length of the filter assembly and is provided at intervals with downward extensions 66 each equipped with a jet spray 68, one such extension and spray being provided for each filter face of each disc filter 36. The supply pipe 64 is rotatably supported in bearings 70 and is provided at its-left hand end as shown in FIG. 1 with a cam follower arm 72 which engages a cam 74 on the camshaft 62. It will be noted that for each side of each disc filter 36 there is provided in addition to the jet spray 68, a stationary jet spray 76 which is directed against the outer edge of the layer of filtrate on the filter screen in order to peel the filtrate layer therefrom, and a stationary jet spray 78 which is directed against the upper end of the chute extension 42 in order to assist in moving the peeled off filter cake through its chute into the stock discharge area 40 of the device. Each of the jet sprays 76 is connected to a supply pipe 80, which extends overhead along the length of the filter assembly. Similarly, each of the jet sprays 78 is connected with a supply pipe 82 which is mounted to extend overhead along the length of the filter assembly.

Each disc filter 36 includes, in this embodiment, 18 disc filter sections which are rigidly secured in closely abutting relation to the core assembly. In other embodiments, a different number of disc filter sections can be used. Each disc section as shown in the drawings comprises a base 92 having lateral extensions or feet 94 which are reinforced by flanges 96 and an additional cross piece 98 (see FIG. 5.). Extending outwardly from the base are a pair of outwardly expanding wedge-shaped filter section leaves 100. The leaves are spaced from one another longitudinally of the rotational axis and are connected in the spaced relation by means of transverse walls 102 which extend outwardly from the base to the outer periphery of the filter section 90. The outer faces of the filter section leaves 100 are formed as section areas which are covered by filter screens 104 and are in substantially parallel relation to one another. It will be noted further that the inner faces of the leaves converge toward one another toward the base 92.

The suction areas of the respective filter section leaves covered by filter screens 104 are provided with radially disposed grooves 106 which, as best shown in FIG. 6 of the drawings, are tapered in a direction to provide grooves of increasing depth and correspondingly increasing sectional area toward the base of the filter section. Each of the filter sections is further provided at intervals with transverse grooves 108 which cut across the radially extending grooves 106 to insure a free flow of air and of liquid from the suction area of the filter section. At the inner or base end of the filter section each of the grooves 106 is connected into an exhaust passageway 110 in the base 92. The passageway referred to is connected with both grooves and is sealed off from the space between the leaves by a transverse wall 112 (see FIG. 6).

As shown in FIGS. 2, 3, and 5 the left hand or trailing edge 114 of each disc filter section 90, assuming a clockwise direction of rotation, is swept backwardly beginning with its point of attachment with the core assembly. With this arrangement as shown in FIG. 3 the trailing edge of the filter disc section with its rising movement reaches a horizontal position at a point which is substantially above a horizontal plane passing through the axis of the rotation of the core bearing assemblies 21, 22. In the operation of the filter it is of considerable advantage to adjust the level of the bath so that the trailing edge of each individual filter section will leave the surface of the bath all at the same instant.

The base portion of the filter section enters the bath followed by the more outward portions thus substantially increasing the time taken for submergence, and correspondingly increasing the time during which the filter section is being filled with liquid. There is as a result, less tendency of the apparatus to suck air when suction is applied.

The core assembly 23 of the illustrated apparatus comprises the core bearing shaft 21, 22, and, associated therewith, several longitudinally extending discharge conduits 120 which are grouped around the core axis and provide an alternatively available vacuum exhaust, and atmospheric pressure supply passageway between each individual disc filter section and a vacuum exhaust manifold and an associated atmospheric pressure inlet manifold disposed at one end of the slurry bath.

The number of discharge conduits corresponds with the number of disc filter sections provided for one disc filter unit, eighteen such discharge conduits 120 being provided grouped about the core axis in the embodiment of the disc filter shown.

The discharge conduits 120 are made up of a series of plates 122, each having a Z-shaped cross section as best shown in FIGS. 9 and 10. The plates are slightly arcuately shaped transversely and are fitted together to form said series of conduits 120. The plates 122 are welded together and are further supported by a series of discs 124 the end ones of which are in turn fastened to the short bearing shafts 21, 22, thus providing a rigid rotatable core assembly. Referring specifically to FIG. 9, each of the plates 122 has formed therein a series of six cutouts 126 (see FIG. 9) which provide ports connecting with the passageways 110 in the base of each disc filter section 90. The several plates 122 forming the discharge conduits as above noted are welded rigidly together to form a solid core assembly. An external frame 128 consisting of two annular straps 130 and cross pieces 132 mounted on the core assembly at the location of each filter section assembly along the length of the core serve to fully enclose the passageways provided through the discharge conduits 120, ports 126, and passageways 110 to the respective disc filter section exhaust areas. The individual disc filter sections 90 are rigidly secured to the straps 130 by means of machine screws 134 threaded into the straps 130. The construction described is such that each discharge conduit 120 is connected with each of the six disc filter sections 90, one from each filter unit 36 which occupy the same angular position on the core along the length of the rotatable core assembly.

The continuous disc filter also includes conventional means (not shown) for applying an exhaust suction through discharge conduits 120 from the several filter sections while each of the sections is submerged in the slurry bath, and for substituting a normal atmospheric pressure to facilitate the peeling off of deposited filter cake from the filter screen 104 when the filter sections 90 have moved out of the slurry bath 20. The suction device referred to comprises an exhaust manifold (not shown) in the form of a housing which is connected to one end wall 26 of the slurry bath 20, and through which the end of the core bearing shaft 22 is projected. An exhaust suction is applied to the suction areas of the respective disc filter sections through the exhaust manifold by means of two exhaust pipes 142, 144 which, as best shown in FIG. 2, are connected respectively to the exhaust manifold.

In addition to the exhaust manifold, there is also provided an inlet manifold (not shown) through which air at atmospheric pressure is supplied to those discharge conduits 120 and associated disc filter sections 90 which are out of the bath and from which the collected filter cake is being removed. The means associated with the control tank 182 for maintaining the level of the slurry bath is diagrammatically indicated in FIG. 2 of the drawings by means of a box 183 entitled Level Control Means.

The filter disc assembly is continuously rotated from the driving connections including belt 44, worm 50 and worm gear 52. A suitable air suction is continuously applied to the exhaust manifold through the exhaust pipes 142, :144. The air inlet manifold is always open to atmosphere through an inlet pipe connection (not shown).

The continuous disc filter of FIGS. 1 to 10 is what is referred to as a center shaft style disc filter, or CDI disc filter. In a CDI disc filter, the discharge conduits are located inside the center shaft of the disc filter rotor, inside the disc filter sections. There is also another conventional continuous disc filter known as a Center Disc Peripheral or CDP continuous disc filter 170 (see FIG. 11). The CDP continuous disc filter 170 has discharge conduits 174 located on the outer periphery of a disc core assembly, as illustrated schematically in FIG. 11. The CDP continuous disc filter 170 does not remove a significant amount of the filtrate 258 from inside filter section 172, as shown schematically in FIG. 11, so its cake production is less than that of comparable CDI filter.

FIG. 12 is an end cross sectional view looking from the right like FIG. 2 of another embodiment of a conventional CDI disc filter rotor assembly 188 with an outside diameter of 5.2 meters and a hydraulic capacity of 100,000 liters per minute. Discharge conduits 190 are arranged in a radially extending pattern from geometric center 192 between various filter sections 194.

SUMMARY

Disclosed is a continuous disc filter device including a slurry containing bath, and a disc filter assembly comprising a core assembly supported to turn on a horizontal axis and having a filtrate outlet end, a plurality of filter discs spaced apart along the length of the core assembly horizontal axis, a plurality of spaced apart discharge conduits, and a plurality of disc filter section support and filtrate channel arms. Each disc filter section has a disc filter section filtrate outlet therein for filtrate to leave the disc filter section. Each discharge conduit includes a discharge conduit housing extending along the core assembly horizontal axis and having a longitudinally extending discharge conduit filtrate passageway therein, each discharge conduit being connected at one end to the core assembly filtrate outlet end and connected to respective disc filter section filtrate outlets, and each discharge conduit filtrate passageway being positioned between adjacent filter sections.

The continuous disc filter device of this disclosure provides a significant increase in capacity for a conventional disc filter of the same size and capacity.

BRIEF DESCRIPTION OF THE DRAWINGS

FIG. 5 is an enlarged detail elevation view of one of the disc filter sections of the mechanism of FIG. 1, a portion of the filter screen being broken away to show the arrangement of underlying grooves.

FIG. 6 is a sectional view taken on a line 6-6 of FIG. 5 with an intermediate portion of the disc filter "section having been broken away; this figure illustrating the arrangement of the filter leaves projecting upwardly from the base and also illustrating the increasing depth or taper of the grooves in a direction toward the base of the filter section.

FIG. 7 is a detail sectional view taken on line 7-7 of FIG. 6.

FIG. 8 is a sectional plan view taken on a line 8-8 of FIG. 5.

Figure 1:
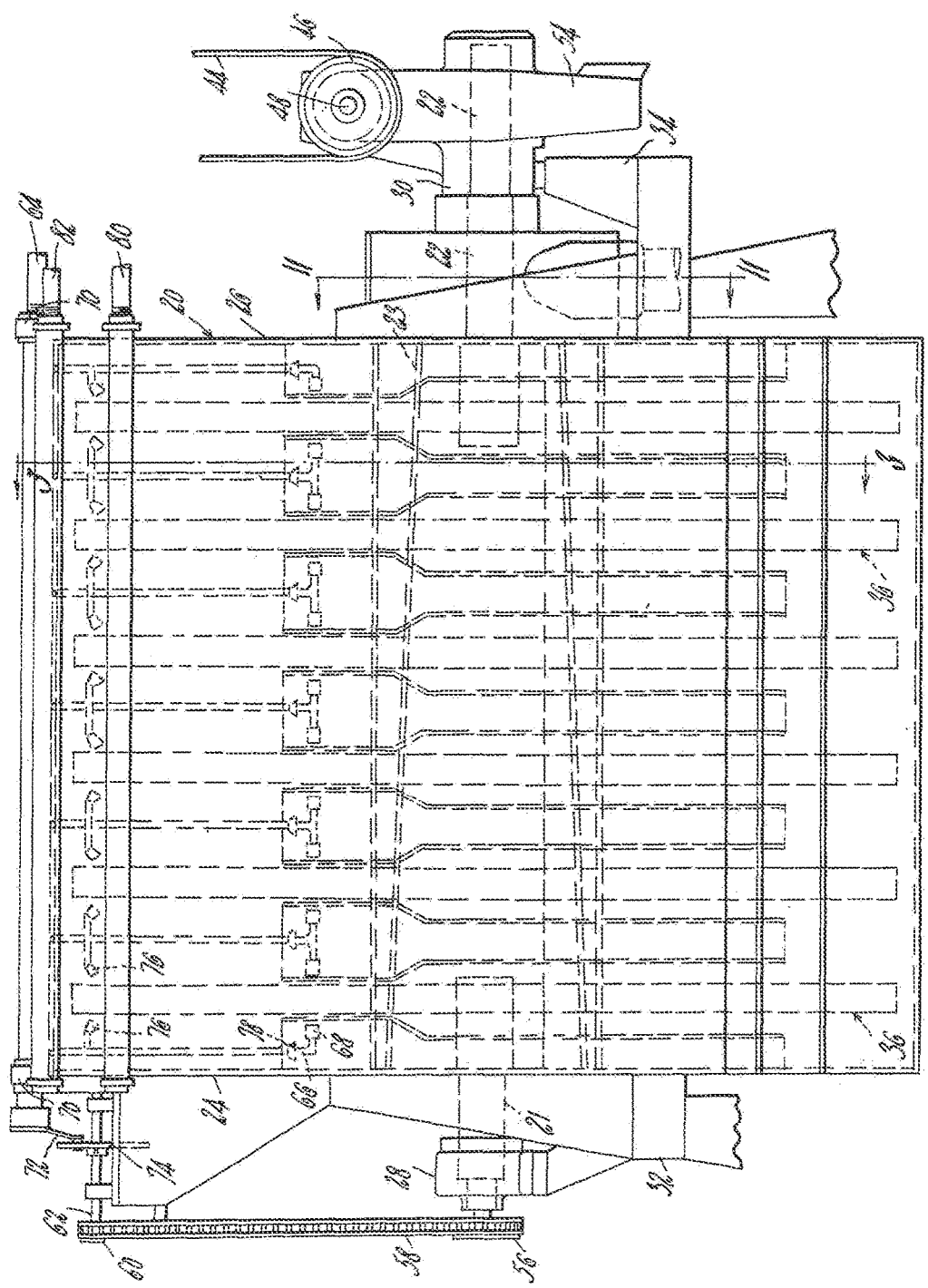
FIG. 1 is a view inside elevation of a conventional rotary disc filter with underlying parts shown in dotted lines to illustrate particularly the arrangement of the slurry containing bath, the disc filter assembly and devices for peeling oil layers of material deposited on the filter screens of the sectioned disc filter.
Figure 2:
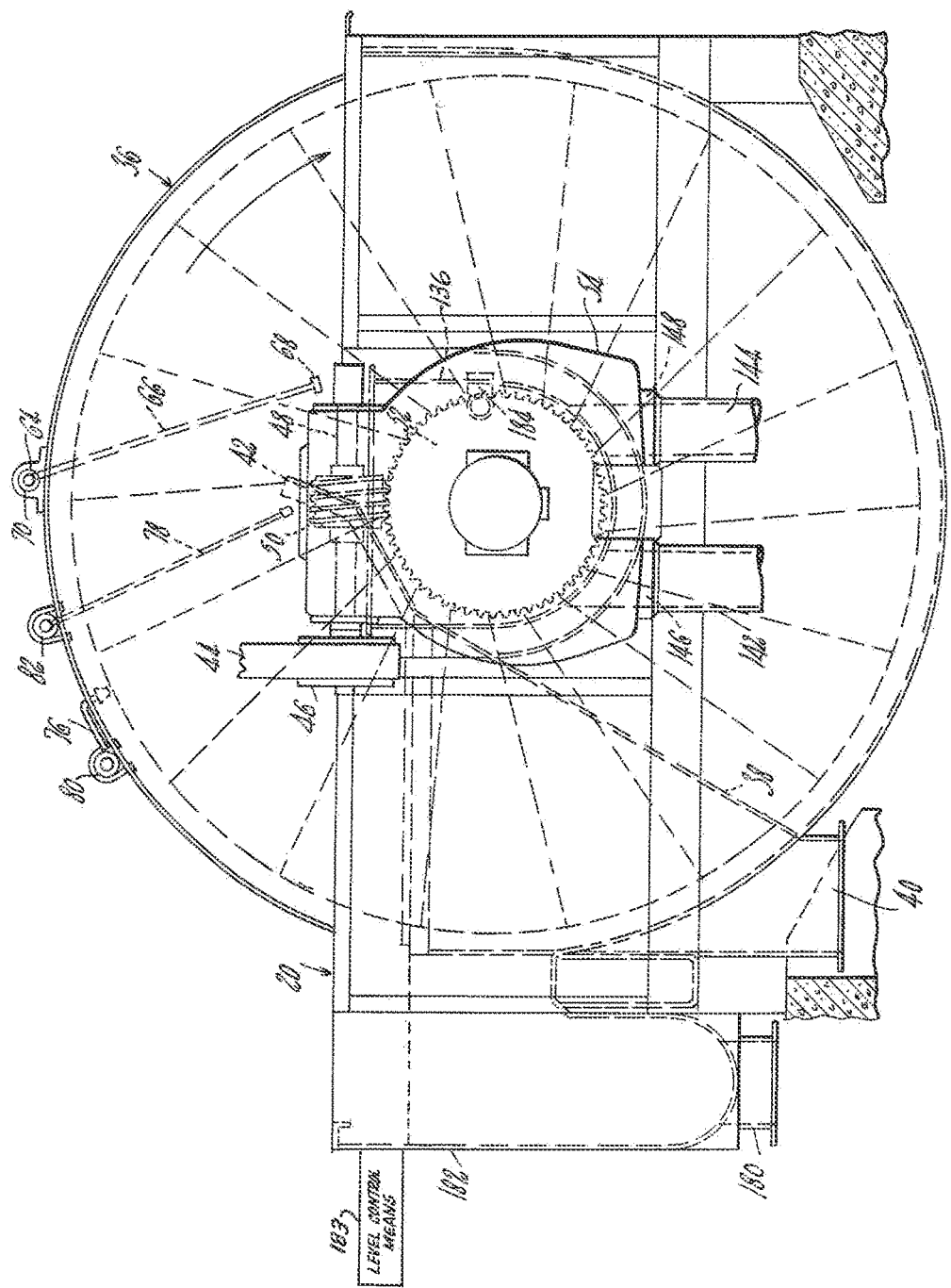
FIG. 2 is an end view looking from the right of substantially the parts shown in FIG. 1, with reference particularly to the drive for the filter assembly and the arrangement of the sectioned filter discs indicated in dotted lines.
Figure 3:
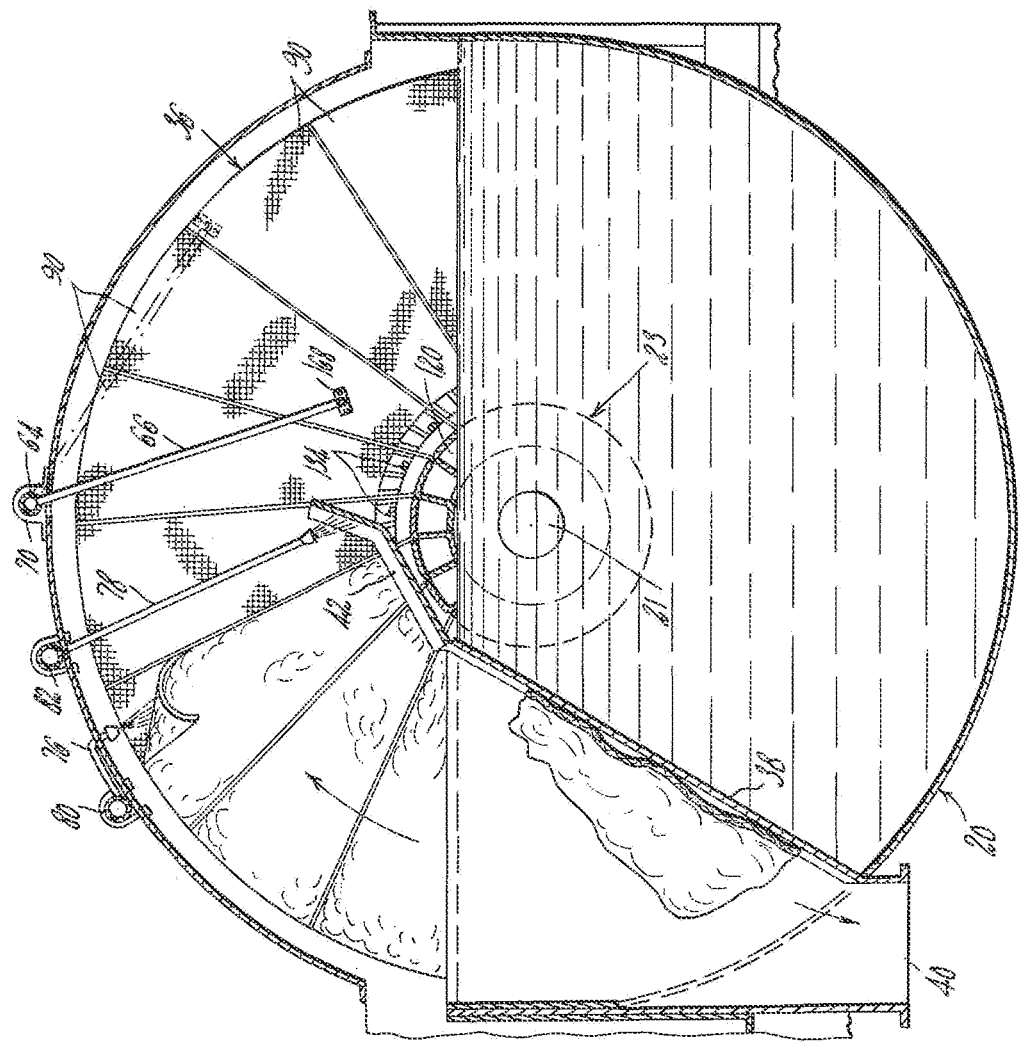
FIG. 3 is a vertical section taken on line 3-3 of FIG. 1 to illustrate particularly the devices for peeling off the deposited layers of material (the filter cake) from the sectioned filter screens.
Figure 4:
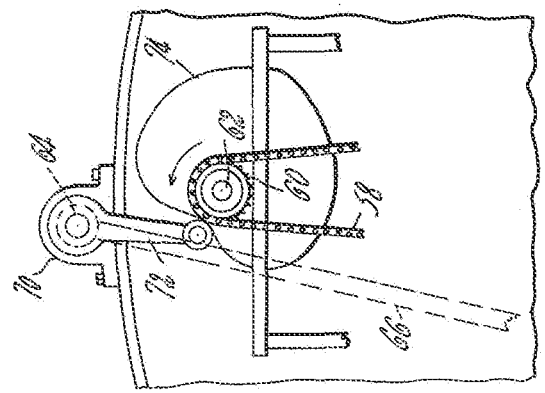
FIG. 4 is an enlarged detail view looking from the left of the mechanism of FIG. 1 for controlling the movement of one of the sprays by means of which the suction screen is kept clean.
Figure 9:
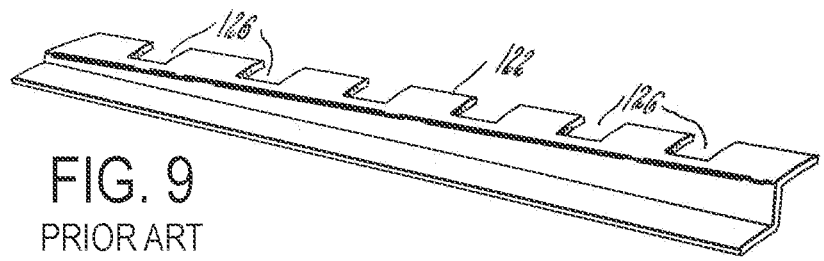
FIG. 9 is a view in perspective of one of the-Z-shaped plates which are assembled to form the plurality of discharge conduits grouped about the axis of the disc filter rotor assembly.
Figure 10:
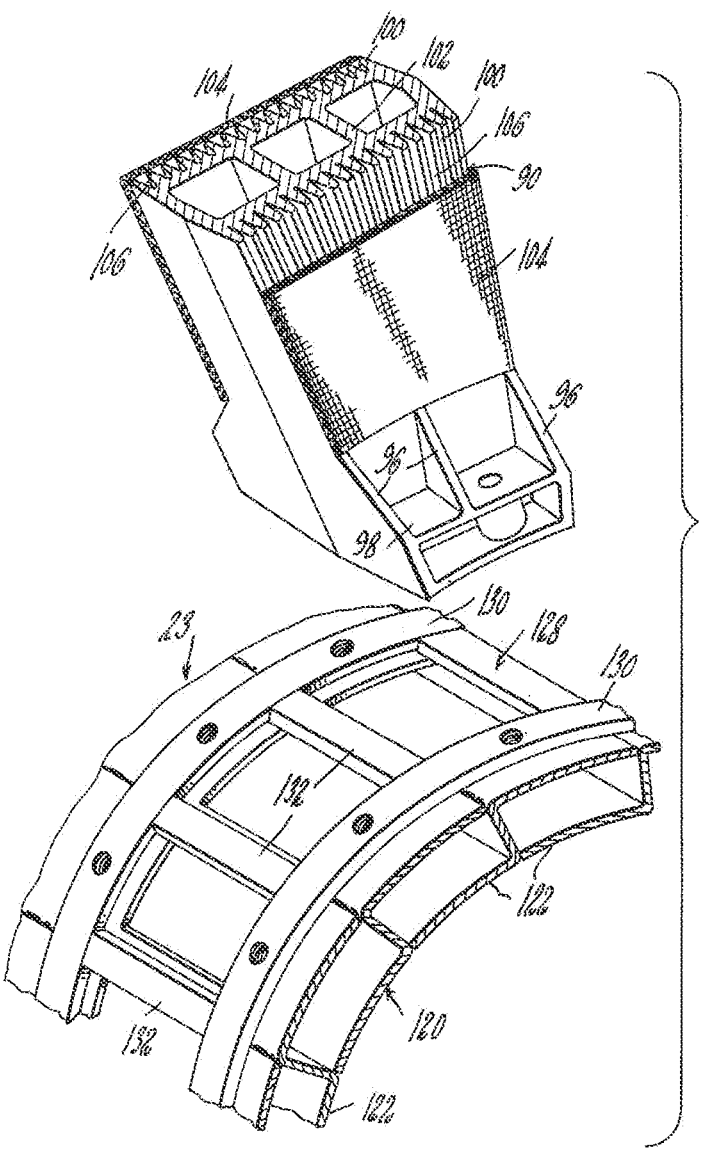
FIG. 10 is an exploded view in perspective of the lower or base portion of the disc filter section as shown for example in FIGS. 7 and 8 together with the arrangement of the Z shaped plates and their supporting outside flanges to form the discharge conduits grouped around the axis of the filter rotor assembly.
Figure 11:
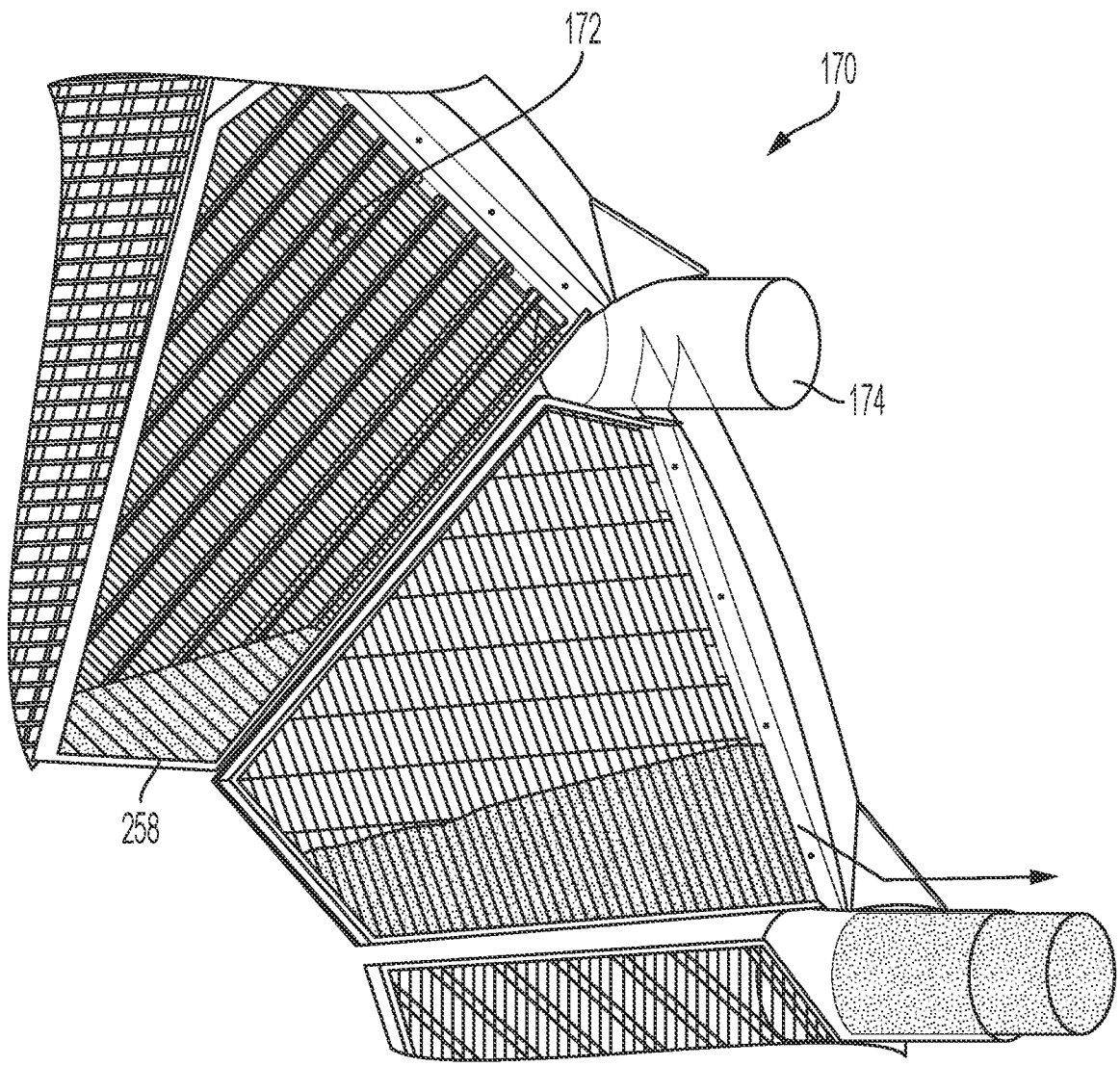
FIG. 11 is a schematic partial view of another conventional disc filter rotor with a discharge conduit located at the periphery of the core outside of the filter sections.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

A continuous disc filter device of this disclosure shares the same or conventionally similar components as that of the continuous disc filter of FIGS. 1 to 12, except for the core/rotor assembly, as explained below.

The continuous disc filter device according to this disclosure includes the slurry containing bath 20, and a disc filter assembly, as illustrated in FIGS. 13 to 20, comprising a rotor assembly 200 supported to turn on a horizontal axis 204 and having a filtrate outlet end 208, a plurality of filter discs 212 spaced apart along the length of the rotor assembly horizontal axis 204, a plurality of spaced apart discharge conduits 216, and a plurality of disc filter section support and filtrate channel arms 220 (see FIGS. 13, and 16 through 20). Each of the filter discs 212 comprises a plurality of filter sections 224 disposed so that the filter sections 224 of each of the several filter discs 212 project outwardly in a plane from the horizontal axis 204.

Figure 13:
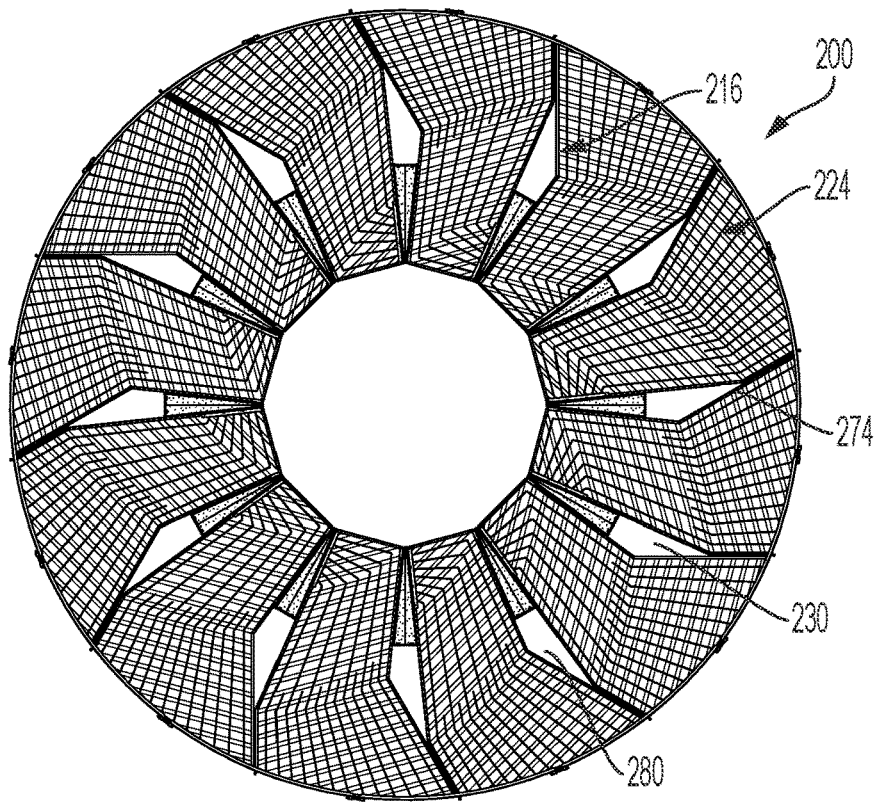
FIG. 13 is an end cross sectional view looking from the right like FIG. 12 of a disc filter rotor according to this disclosure with an outside diameter of 5.2 meters and a hydraulic capacity of 100,000 liters per minute.
Figure 14:
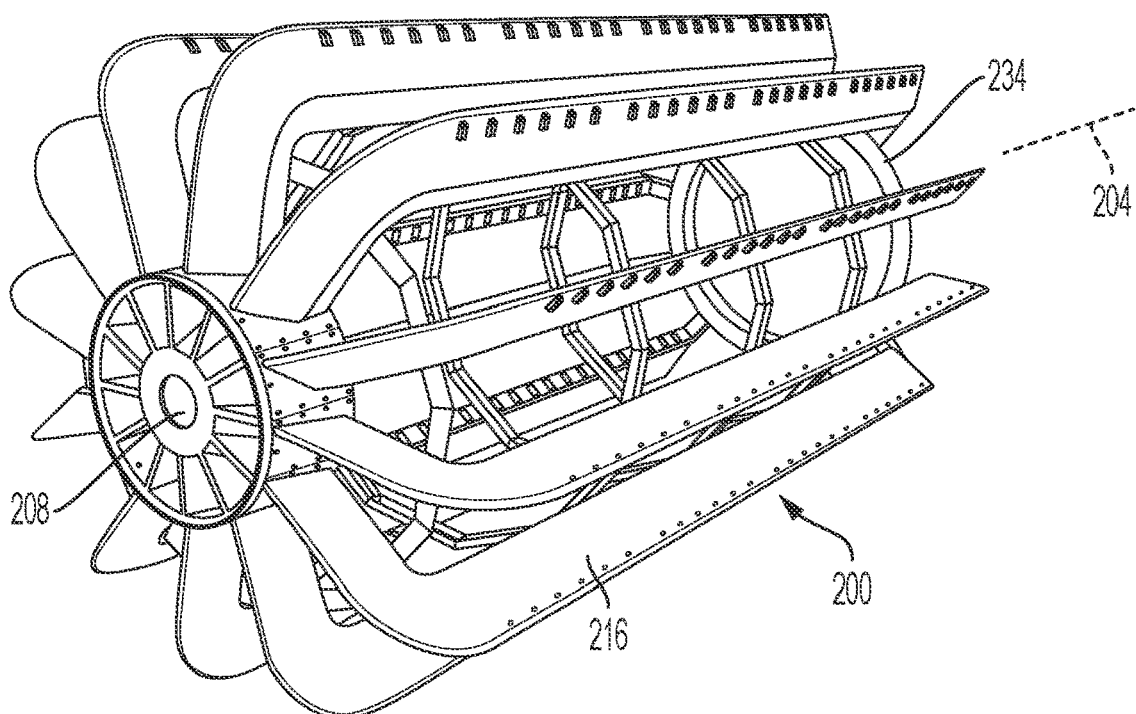
FIG. 14 is an end perspective view of the disc filter rotor shown in FIG. 13 with the filter sections removed.
Figure 15:
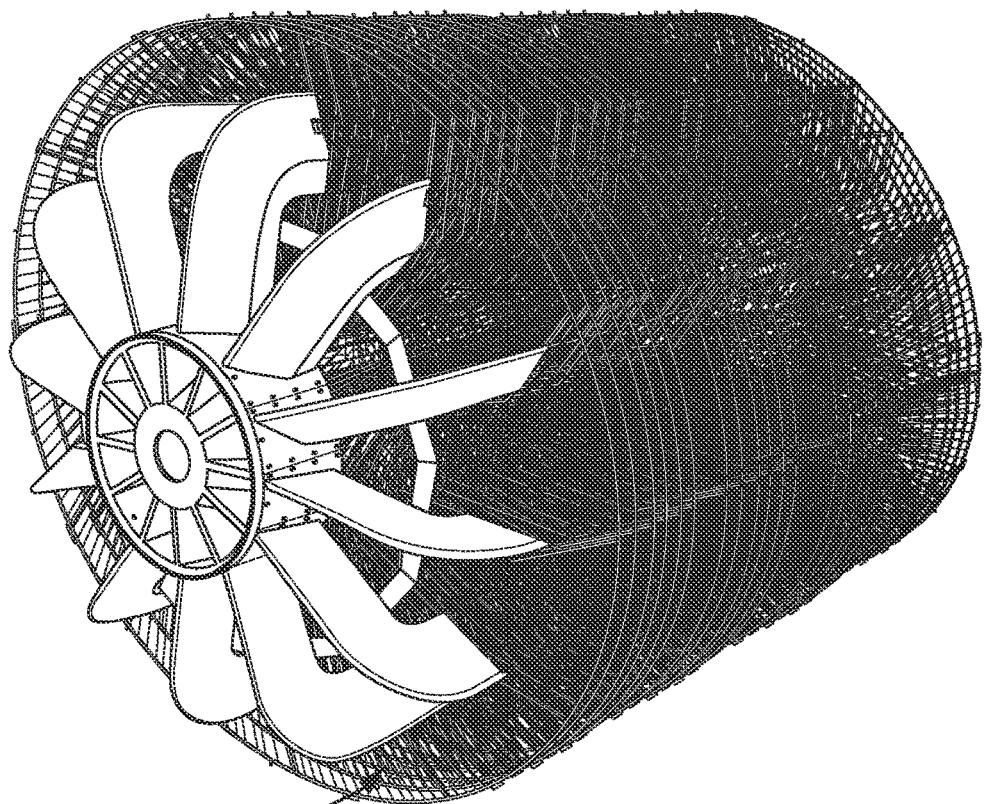
FIG. 15 is an end perspective view of the disc filter rotor shown in FIG. 14 with the filter sections.

As shown in FIG. 13, adjacent disc filter sections 224 form a triangular area 230 extending about two thirds of the way up from the inner end of the filter sections 224. As shown in FIG. 14 the disc filter rotor assembly 200 in FIG. 13 with the filter sections removed, the discharge conduits 216 are held in a spaced apart relationship by a plurality of spaced apart arm brackets 234 attached to and between adjacent discharge conduits 216. FIG. 15 shows how the various filter sections 224 are connected to and supported by the hydraulic conduits 216.

Each filter section 224 includes first and second screen faces (see FIG. 18) defining a filter cake screen covered suction area, a bottom rail 244 defining a radially inner end near the rotor assembly horizontal axis 204, and a top rail 248 forming a radially outer end. Each filter section 224 further includes a first side rail 250 connected at one end to the bottom rail 244 and at an opposite end to one end of the top rail 248. The first side rail 250 also has a bottom portion 254 having a disc filter section filtrate outlet 260 therein for filtrate 258 to leave the disc filter section 224 (see FIG. 20). Each filter section 224 also includes a second side rail 264 connected at one end to the bottom rail 244 and at an opposite end to the other end of the top rail 248. Each disc filter section 224 further includes spaced apart channel ribs 268 extending between the first side rail bottom portion 254 and the top rail 248 for channeling filtrate 258 to the first side rail bottom portion 254, and screen wire 270 extending between the side rails on each face of the disc filter section 224, the screen wire 270 supporting the ribs 268. The disc filter section first and second side rails of adjacent disc filter sections form the triangular area 230 extending about two thirds of the way up from the filter section bottom rail 244.

Each discharge conduit 216 includes a discharge conduit housing 274 extending along the rotor assembly horizontal axis 204 and having a longitudinally extending discharge conduit filtrate passageway 280 therein, each discharge conduit 216 being connected at one end to the rotor assembly filtrate outlet end 208. Each discharge conduit housing 274 has an inner wall 284 nearest the core horizontal axis 204, the inner wall 284 having a plurality of spaced apart discharge conduit filtrate inlets 290 into its respective conduit filtrate passageway 280. Each of the discharge conduit passageways 280 is positioned between adjacent filter sections 224 and spaced apart from the disc filter section bottom rail 244 and spaced apart from the disc filter top rail 248 except for where the discharge conduit housings 274 connect to the filter rotor assembly filtrate outlet end 208.

Each of the plurality of disc filter section support and filtrate channel arms 220 is spaced apart along and attached to one of the plurality of discharge conduits 216. Each filtrate channel arm 220 has a filtrate channel inlet 294 in fluid communication with a respective one of the disc filter section filtrate outlets 260 and a filtrate channel arm outlet 298 in fluid communication with one of the discharge conduit filtrate inlets 290 so that each discharge conduit filtrate passageway 280 is connected with a plurality of the disc filter section filtrate outlets 260 along the length of the rotor assembly horizontal axis 204. Each disc filter section support and filtrate channel arm 220 is positioned at about the bottom one third of the disc filter section 224 and each disc filter section discharge conduit housing 274 is positioned at about the middle third of the disc filter section 224.

Figure 16:
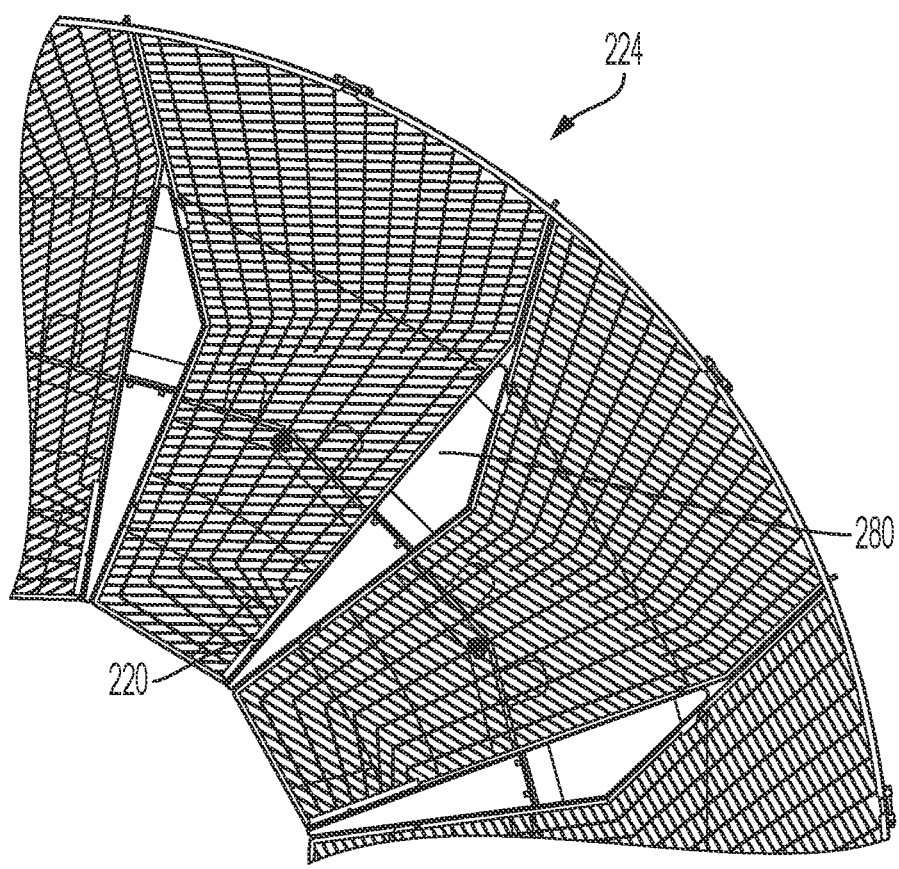
FIG. 16 is an enlarged view of a few of the filter sections shown in FIG. 13.
Figure 17:
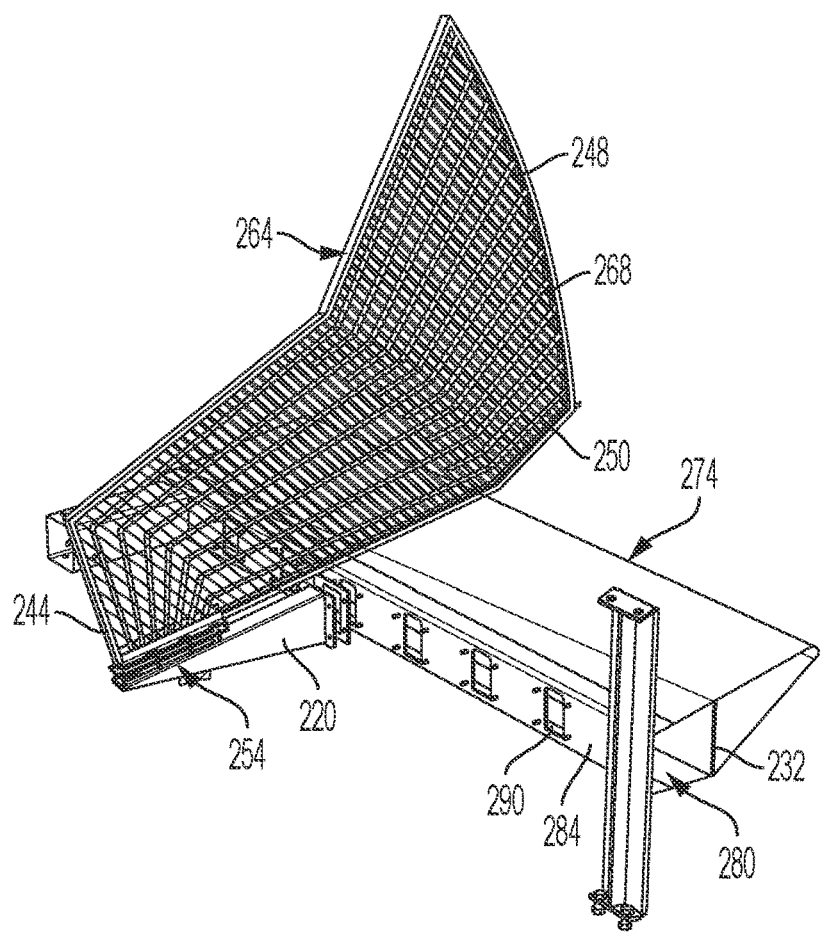
FIG. 17 is a side perspective view of a portion of a discharge conduit with one filter section and one disc filter section support and filtrate channel arm.
Figure 18:
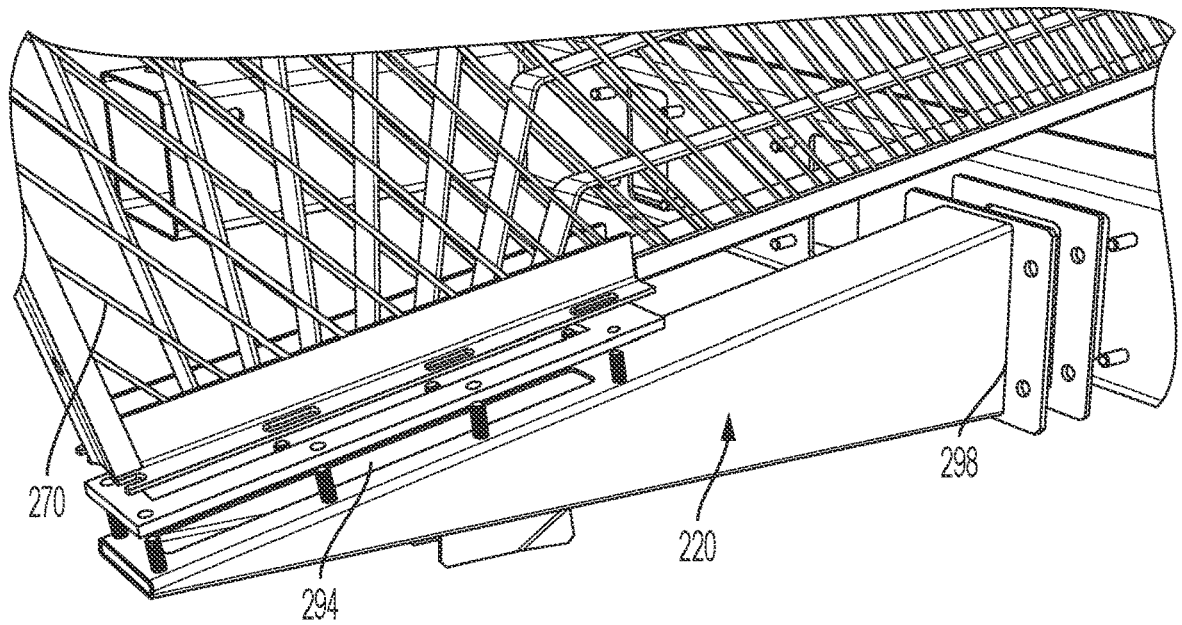
FIG. 18 is an enlarged view of the connection of the filter section and disc filter section support and filtrate channel arm to the discharge conduit shown in FIG. 17.
Figure 19:
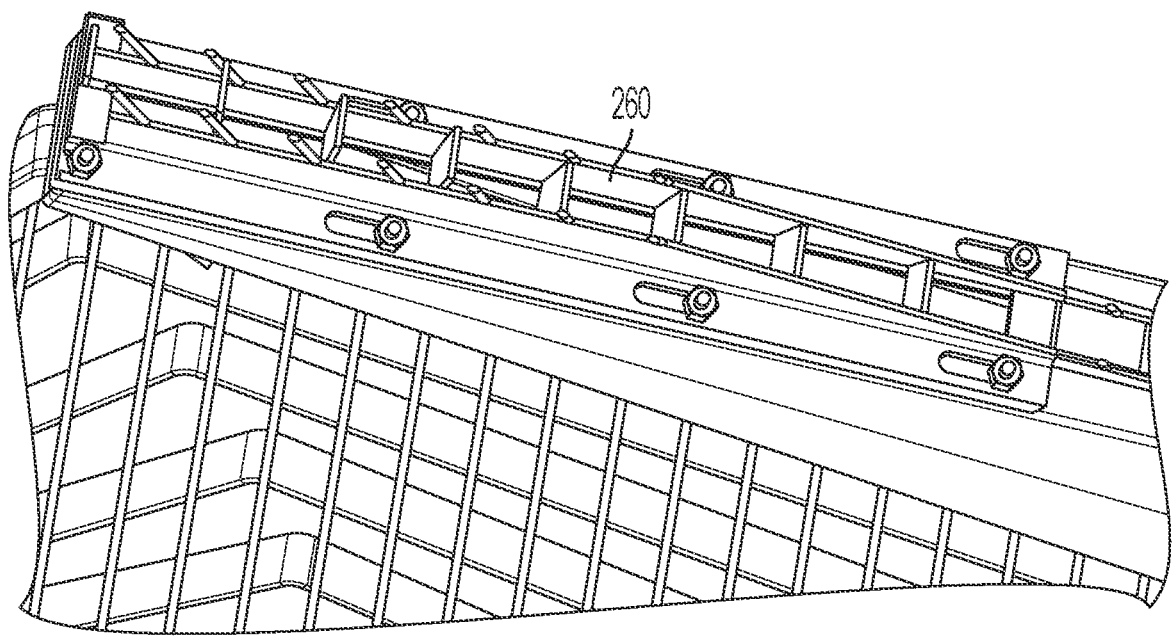
FIG. 19 is a right-side partial perspective view of a bottom portion of the filter section shown in FIG. 18.
Figure 20:
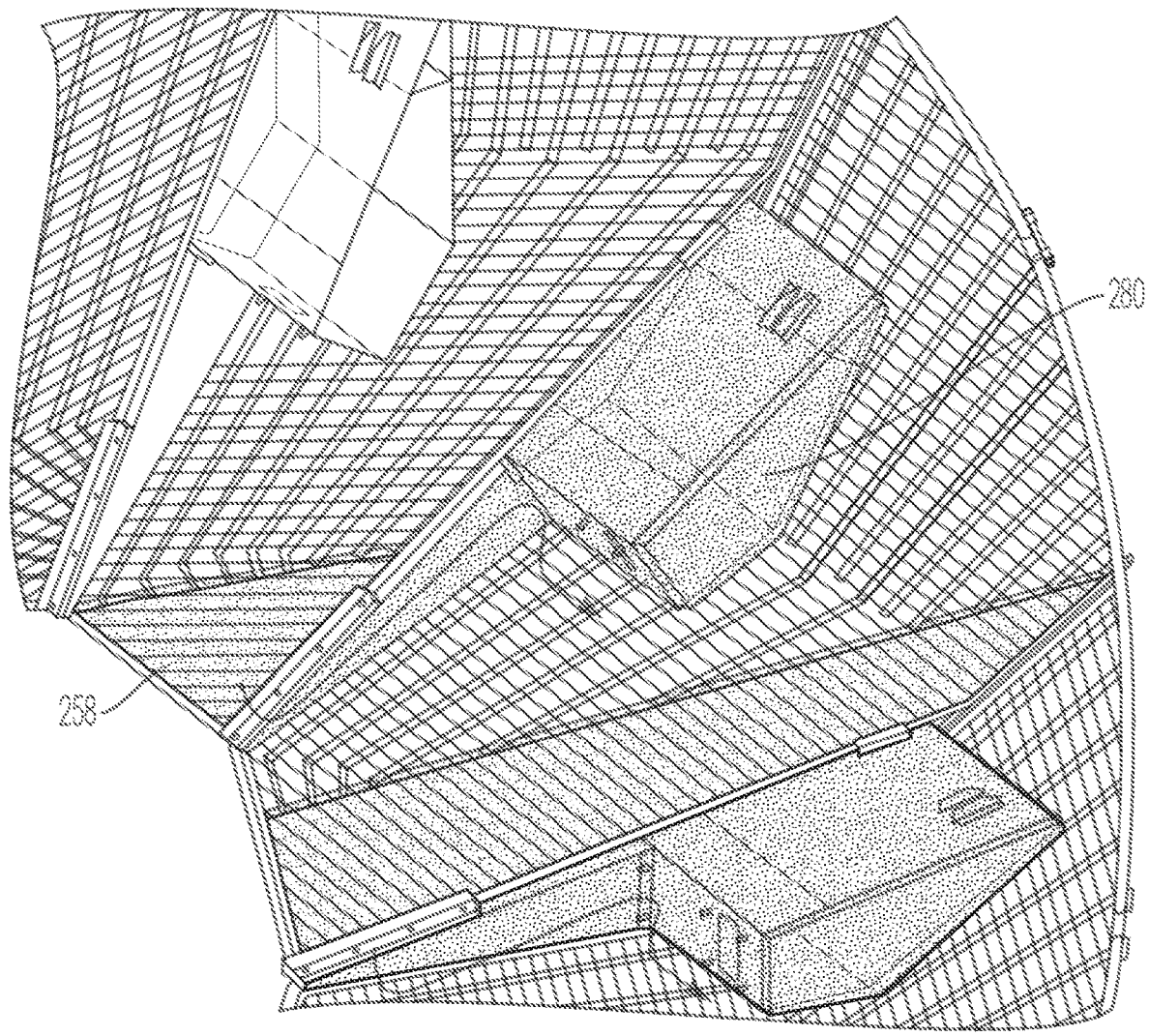
FIG. 20 is a schematic partial view of the disc filter rotor of this disclosure with the discharge conduit located between adjacent filter sections, illustrating how filtrate is siphoned out from the bottom right corner of each filter section as the disc filter rotates counterclockwise.

The discharge conduit housing 274 has a quadrilateral cross section (as shown in FIGS. 16 and 17) in a direction perpendicular to the discharge passageway longitudinal axis, and the discharge conduit housing 274 further includes a discharge conduit partition 232 within the discharge conduit housing 274 extending along the discharge conduit longitudinal axis, the space between the discharge conduit partition 232 and the discharge conduit inner wall 284 defining the filtrate passageway 280. The discharge conduit partition 232, as shown by a dashed line in FIG. 17, is angled relative to the discharge conduit inner wall 284 so that a narrower discharge conduit filtrate passageway 280 is at the distal end of the discharge conduit 216 and a wider discharge conduit filtrate passageway 280 is at the filter outlet end 208 of the discharge conduit 216. FIG. 16 shows the discharge conduit passageway 280 as a shaded area of about two thirds of the discharge conduit housing 274 at the location of this cross section.

In operation, it is important for a continuous disc filter to remove as much as possible of the filtrate in each filter section to maximize the amount of fiber removal from the slurry. Any filtrate left in a filter section as it leaves the slurry bath results in fiber adjacent the liquid not ending up in the fiber cake.

As described earlier, the liquid in each filter section is removed by a combination of suction and gravity. It is therefore desirable to provide filtrate contact with the discharge conduit passageways for as long as possible to remove as much as possible of the filtrate from between the filter sections. In the continuous disc filter of this disclosure, the filtrate remains in contact with the filtrate 280 leaving the filter section 224, as illustrated schematically in FIG. 20, so the pull of the filtrate as in a siphon (shown by the thick arrow in FIG. 20) serves to remove most of the filtrate 280 out of the filter section 224.

Figure 12:
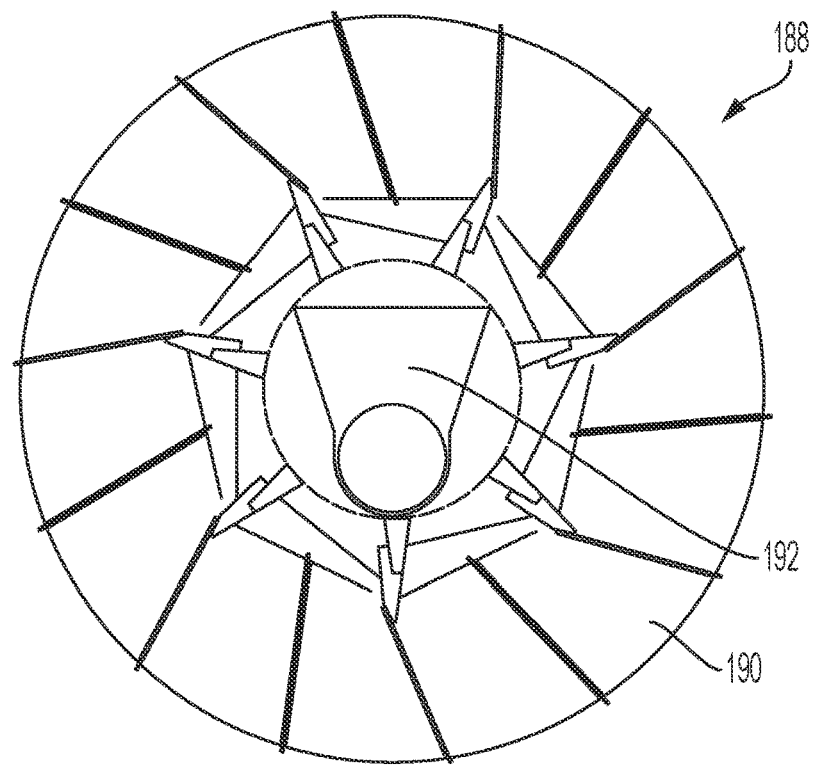
FIG. 12 is an end cross sectional view looking from the right like FIG. 2 of another embodiment of a conventional style disc filter rotor with an outside diameter of 5.2 meters and a hydraulic capacity of 100,000 liters per minute.

In one embodiment, the continuous disc filter of this disclosure has an outside diameter of 5.2 meters and a hydraulic capacity of 100,000 liters per minute, as shown in FIG. 13. As compared to a conventional CDI disc filter of a similar size and hydraulic capacity, as shown in FIG. 12, the filter sections of this disclosure are narrower but longer than the CDI filter sections, resulting in an increase of filter section surface area from 26.7 square meters to 31.2 square meters. As a result, there is about a 17% increase in available net filter section surface area with the continuous disc filter of this disclosure as compared to the conventional CDI disc filter. This translates into at least 17% more cake production. This is a quite significant increase in capacity for a disc filter of the same size and capacity as that of a comparable CDI disc filter.

Various other features of this disclosure are set forth in the following claims.

The invention claimed is:

1. A continuous disc filter device including:
   a slurry containing bath, and
   a disc filter assembly comprising a rotor assembly supported to turn on a horizontal axis and having a filtrate outlet end and a plurality of filter discs spaced apart along the length of the rotor assembly horizontal axis,
   each of the filter discs comprising a plurality of filter sections disposed so that the filter sections of each of the several filter discs project outwardly in a plane from the horizontal axis,
   each filter section including:
   first and second screen faces defining a filter cake screen covered suction area,
   a bottom rail defining a radially inner end near the rotor assembly horizontal axis,
   a top rail forming a radially outer end,
   a first side rail connected at one end to the bottom rail and at an opposite end to one end of the top rail and having a bottom portion having a disc filter section filtrate outlet adjacent the bottom rail therein for filtrate to leave the disc filter section, and
   a second side rail connected at one end to the bottom rail and at an opposite end to the other end of the top rail,
   a plurality of spaced apart discharge conduits, each including a discharge conduit housing extending along the rotor assembly horizontal axis and having a longitudinally extending discharge conduit filtrate passageway therein, each discharge conduit being connected at one end to the rotor assembly filtrate outlet end, and each discharge conduit housing having an inner wall nearest the horizontal axis, the discharge conduit housing inner wall having a plurality of spaced apart discharge conduit filtrate inlets into its respective conduit filtrate passageway, each of the discharge conduit filtrate passageways being positioned spaced apart from the disc filter section inner end and spaced apart from the disc filter outer end and between adjacent filter sections, and
   a plurality of disc filter section support and filtrate channel arms spaced apart along and attached to one of the plurality of discharge conduits, each filtrate channel arm having a filtrate channel inlet in fluid communication with a respective one of the disc filter section filtrate outlets and a filtrate channel arm outlet in fluid communication with one of the discharge conduit filtrate inlets so that each discharge conduit filtrate passageway is connected with a plurality of the disc filter section filtrate outlets along the length of the rotor assembly horizontal axis.

2. The continuous disc filter device of claim 1 wherein each disc filter section further includes spaced apart channel ribs extending between the first side rail bottom portion and the top rail for channeling filtrate to the first side rail bottom portion, and screen wire on each face of the disc filter section.

3. The continuous disc filter device of claim 1 wherein the discharge conduit housing has a quadrilateral cross section in a direction perpendicular to the discharge conduit longitudinal axis.

4. The continuous disc filter device of claim 1 wherein the disc filter section first and second side rails of adjacent disc filter sections form a triangular area extending about two thirds of the way up from the filter section bottom rail.

5. The continuous disc filter device of claim 1 wherein each disc filter section support and filtrate channel arm is positioned at about the bottom one third of the disc filter section and the disc filter section discharge conduit housing is positioned at about the middle third of the disc filter section.

6. The continuous disc filter device of claim 1 wherein the discharge conduit housing further includes a discharge conduit partition within the discharge conduit housing extending along the discharge conduit longitudinal axis, the space between the discharge conduit partition and the discharge conduit inner wall defining the filtrate passageway, the discharge conduit partition being angled relative to the discharge conduit inner wall so that a narrower discharge conduit filtrate passageway is at the distal end of the discharge conduit and a wider discharge conduit filtrate passageway is at the filter outlet end of the discharge conduit.

* * * * *